No. 642,020. Patented Jan. 23, 1900.
R. TUCKER & F. BOYLING.
VEHICLE BRAKE.
(Application filed Jan 13, 1898.)
(No Model.) 2 Sheets—Sheet 1.

No. 642,020. Patented Jan. 23, 1900.
R. TUCKER & F. BOYLING.
VEHICLE BRAKE.
(Application filed Jan. 13, 1898.)

(No Model.) 2 Sheets—Sheet 2.

Witnesses
Maynard Harris
Jno. D. Robbins.

Inventors
Robert Tucker and Frederick Boyling
By their Attorneys
E. F. Maddocks & Co.

UNITED STATES PATENT OFFICE.

ROBERT TUCKER, OF NEWCASTLE, AND FREDERICK BOYLING, OF SYDNEY, NEW SOUTH WALES.

VEHICLE-BRAKE.

SPECIFICATION forming part of Letters Patent No. 642,020, dated January 23, 1900.

Application filed January 13, 1898. Serial No. 666,560. (No model.)

*To all whom it may concern:*

Be it known that we, ROBERT TUCKER, residing at Newcastle, and FREDERICK BOYLING, residing at Sydney, in the Colony of New South Wales, subjects of the Queen of Great Britain and Ireland, have invented certain new and useful Improvements in Vehicle-Brakes; and we do hereby declare the following to be a full, clear, and exact description of the invention, such as will enable others skilled in the art to which it appertains to make and use the same.

Our invention has for its object the more effectual application of brake-power to road-vehicles of any kind when going down a hill or over a culvert or hollow or when the horse bolts or when attempting to back with the vehicle. This result is obtained through attaching our brake-gear direct to the pole or shafts of the vehicle in such a manner that the brake is operated by the power of the horse or horses. Either the pulling or backing power of the horse can be utilized to apply the brake at the will of the driver through a reversing attachment controlled by him, as hereinafter fully described.

In order that our invention may be better understood, we will now refer to the accompanying sheets of drawings, which are to be taken as part of this specification and read therewith.

Figure 1:
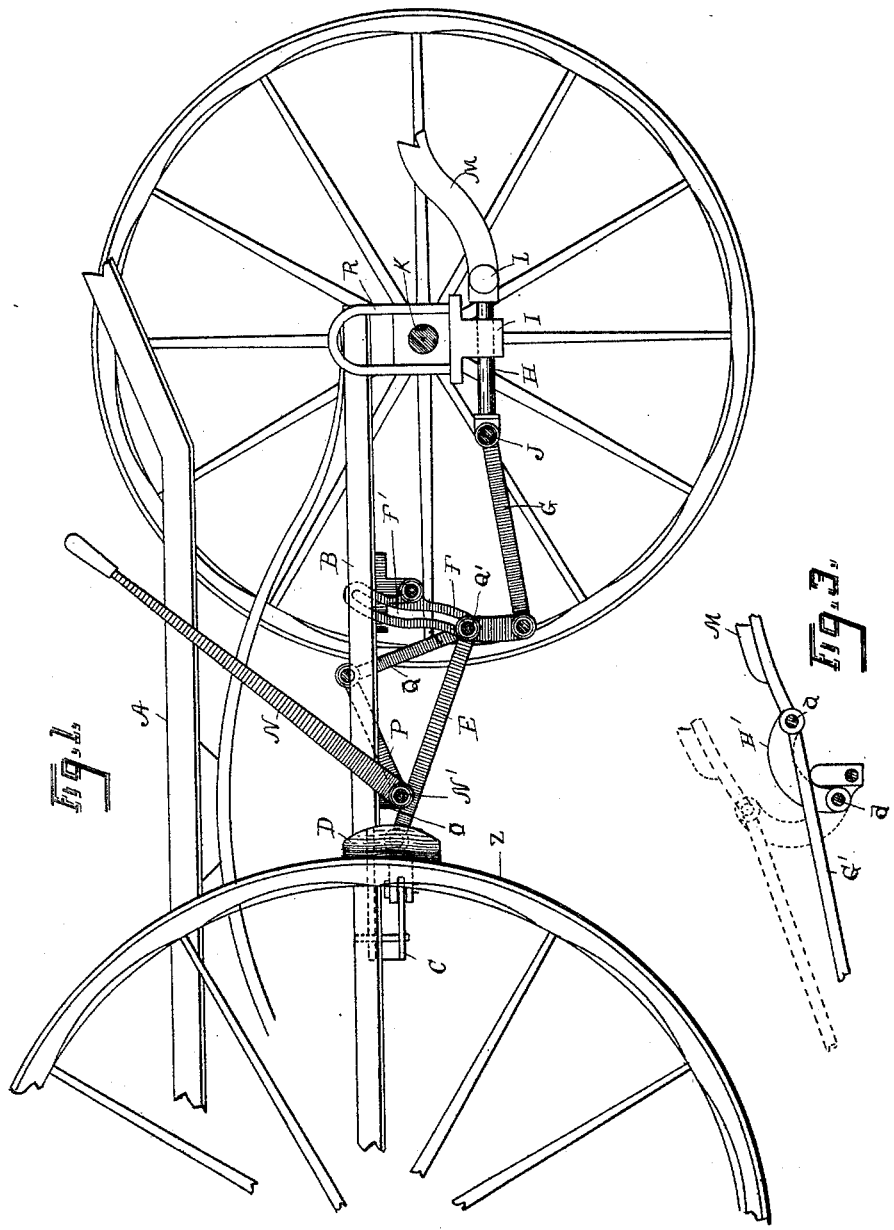
Figure 2:
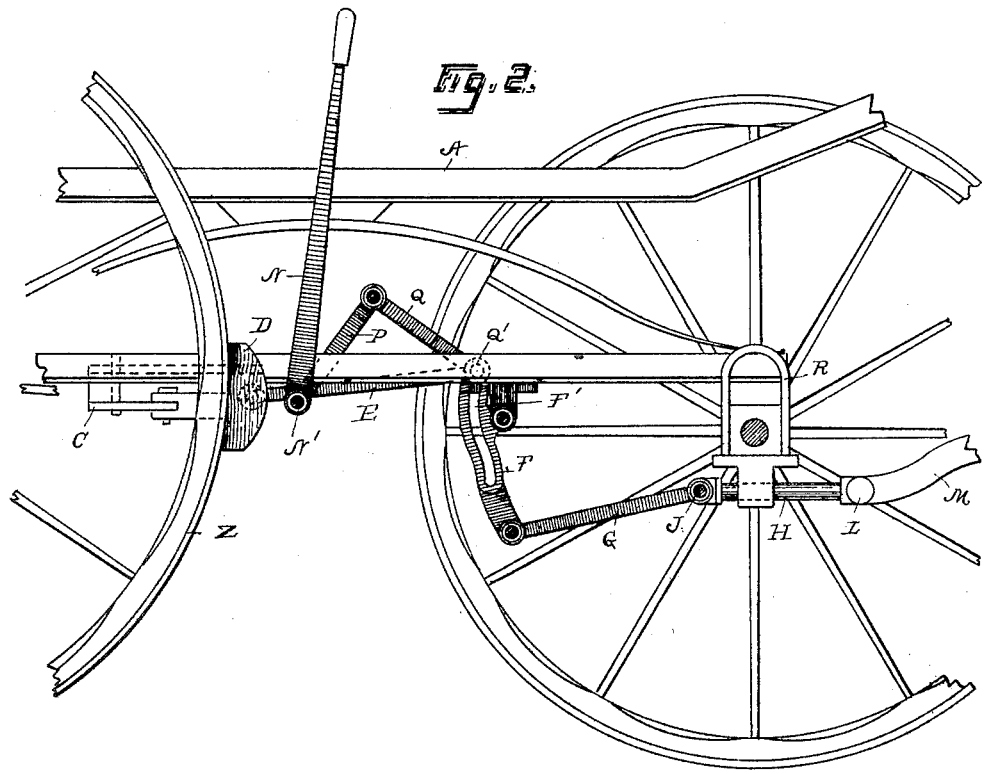

Figure 1 is an elevation showing the undercarriage of a four-wheeled vehicle, to which is fixed our improved operating brake-gear, shown in the position when brake is applied by the horse breeching. Fig. 2 is a similar view to Fig. 1, showing the brake applied by the forward motion of the horse. Figs. 3 and and 4 show modifications.

Referring to Figs. 1 and 2 of the drawings, which represent our brake mechanism as applied to a shafted four-wheel vehicle, A is the bottom of the carriage. B is the undercarriage supporting the body, to which our operating brake-gear is fixed. C is brake lever or arm of any suitable form or construction, which applies the brake-block D to the wheel-tire Z. E is a connecting-rod jointed to the brake-levers and the reversing-link. F is the reversing-link, which is governed by the lever N. F' is a slot in reversing-link along which the joint-bolt Q' travels when operating the said reversing-link. G is a connecting-rod jointed to the lower end of reversing-link and to the middle of the cross-bar J. H is one of two sliding bars passing backward and forward through the journal I. J is the end of cross bar or shaft fastened to and connecting the sliding bar H with its fellow on the other side of the vehicle and to the center of which is jointed the connecting-rod G. K is the end of front axle, under which the journal I is fastened by the clip R. L is the end of sliding bar H, to which the shaft M is bolted. N is the lever governing the reversing-link F. O is a journal bolted to the bottom of the undercarriage bearing-shaft, of which N' is the end and to which is keyed the lever N. P is a crank-arm secured to the said shaft N', passing through and supported by journal O. Q is a connecting-rod jointed to crank-arm P and meeting the rod E at the joint-bolt Q', which slides from end to end in the slot F' of the reversing-link when operated by the lever N, thus reversing the action of the brake. By pulling the lever N into a vertical position, as shown in Fig. 2, the joint-bolt Q', sliding to the top of slot in reversing-link, reverses the gearing of the whole of our mechanism, so that the forward motion of the horse applies the brake. The reversing-link is worked on and supported by a stud S, bolted to the undercarriage. As illustrating more fully the working of our reversing mechanism, we would point out that in Fig. 1, where the lever N is down and the joint-bolt Q' at the bottom of the slot of the reversing-link, the breeching of the horse applies the brake and a forward movement releases it, whereas in Fig. 2, where the lever N is up and the joint-bolt Q' at the top of slot in reversing-link, the brake is applied by the forward movement of the horse and released when he ceases to pull. Fig. 1 represents, of course, the position of the brake-gear in driving under ordinary circumstances, and Fig. 2 the position into which the driver throws the mechanism to prevent the horse from bolting. When going downhill or over a hollow of any kind, the horse holding back forces the sliding bar H, attached to the shaft, back through the journal I, as shown in Fig.

1, and so applies the brake without any action of the driver. Consequently the brake is applied and released at the right moment and not, as is often the case with brakes operated by the driver, put on too late or taken off too soon. The steeper the hill the harder the brake is applied; but should the horse bolt the lever-bar N can be pulled upward by the driver into a vertical position, as shown in Fig. 2, thus operating the reversing-gear and causing the brake to be applied by the forward motion of the horse.

Fig. 3 is a modification or alternative method of shaft connection. In this case a curved metal arm H' is shown in place of sliding bar H in Figs. 1 and 2 and the rod G' takes the place of the rod G. This arm H' and the connecting-bar G' are both pivoted to the shaft M at $a$, while the other end of the arm H' is pivoted to the axle at $d$. When the horse breeches, the arm H' is pushed backward into the position shown by the dotted lines, and the connecting-rod G' then operates the brake-gear in the same manner as the rod G in Figs. 1 and 2.

Figure 4:
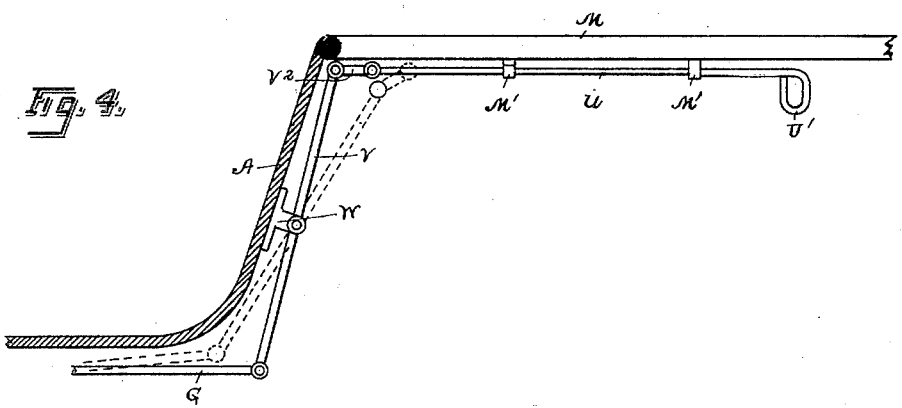

Fig. 4 is a section showing attachment underlying the shafts or pole and operating our brake mechanism when applied to a two-wheeled vehicle. A is the body of the vehicle. M is the shaft. U is a sliding bar underlying the shafts and passing around the front of the vehicle between same and the rear of the horse, U' being a loop thereon, to which the breeching is strapped. M' M' are iron loops attached to the shaft, through which the bar U slides backward and forward. V is a lever-bar the top of which is connected by the joint-bar $V^2$ to the bar U and the lower end of which is jointed to connecting-rod G, which operates the brake mechanism. $V^2$ is a short bar joining the top of lever-bar V to the middle of that portion of the bar U which passes across the front of the vehicle. W is a fixed stud connecting the lever-bar V to the body of the vehicle and forming a fulcrum therefor. J' is moving joint connecting the lever-bar V with the connecting-rod G, which operates the brake mechanism. This figure shows the mechanism in the position occupied by it when the horse is breeching and the brake applied.

We desire it to be clearly understood that we do not confine the application of our mechanism to any form of brake, as it will operate a band-brake on the hub of the wheel as effectively as a block-brake on the tire; but for two-wheeled vehicles we find the band-brake the more suitable.

Having fully described our invention, what we claim, and desire to secure by Letters Patent, is—

The herein-described improved vehicle-brake, comprising a pivotally-supported slotted lever, a brake-arm having a joint-ball at its forward end working in the slot of said lever, a brake-shoe pivoted to the rear end of said brake-arm, a sliding bar designed to be connected to the shafts of a vehicle, a link connecting the same with the lower end of said slotted lever, a hand-lever pivotally supported at its lower end and having an angular arm extending therefrom, and a lever pivoted to said arm or extension and connecting the same with said bolt-joint; substantially as and for the purpose set forth.

In testimony whereof we affix our signatures in presence of two witnesses.

ROBERT TUCKER.
FREDERICK BOYLING.

Witnesses to the signature of Robert Tucker:
WILLIAM COULBOURN BROWN,
GEORGE P. LOED.

Witnesses to the signature of Frederick Boyling:
WALTER SIGMONT,
ROBERT M. CALLOUSEN.